Dec. 8, 1953    W. C. ANDERSON    2,661,551
PROTECTIVE DEVICE
Filed Sept. 20, 1949    2 Sheets-Sheet 1

INVENTOR.
WILMER C. ANDERSON
BY
Louisa E. Norton
ATTORNEY

Dec. 8, 1953    W. C. ANDERSON    2,661,551
PROTECTIVE DEVICE

Filed Sept. 20, 1949    2 Sheets-Sheet 2

INVENTOR.
WILMER C. ANDERSON
BY
Louisa E. Norton
ATTORNEY

Patented Dec. 8, 1953

2,661,551

UNITED STATES PATENT OFFICE 2,661,551

PROTECTIVE DEVICE

Wilmer C. Anderson, Greenwich, Conn., assignor to Deering Milliken Research Trust, Greenwich, Conn., a nonprofit trust of Maine Application September 20, 1949, Serial No. 116,804

7 Claims. (Cl. 38—44)

The present invention relates to detecting and monitoring devices, and more particularly to devices for detecting and signalizing the presence of conductors, such as metal bodies or electrolytes, in non-metallic material in sheet or other form; and comprises a device of this character which, while of general application, is particularly adapted for detecting small metal objects, such as burling needles, in textile fabrics. The new device may be advantageously employed in association with textile finishing machines, such as shearing or pressing machines, to prevent damage to the blades, rolls, or other working parts of the machine either by signalizing the presence of conductors in the fabric or by stopping the operation of the machine.

Briefly, the device of the invention comprises a balancing circuit including a pair of substantially matched coils supplied with alternating current and so positioned with respect to the path of travel of material that anomalies in the material will pass through the field of one or the other of the coils and thereby vary the effective impedance of that coil and disturb the balance of the circuit. When the anomaly is a body of ferrous metal, the inductance of the coil is abruptly altered upon passage of the body into the field of the coil. When the anomaly is an electrolyte, or is a body of non-ferrous material, such as copper, eddy currents induced therein alter the effective resistance of the coil. The new device includes a circuit responsive to such unbalance and adapted to actuate machine stopping elements. The stop motion circuit of the present invention, while similar in many respects to that disclosed and broadly claimed in applicant's copending application Serial No. 38,390, filed July 13, 1948, now Pat. No. 2,596,973, dated May 20, 1952, is a substantial improvement thereover in that the present circuit is substantially more sensitive than that of the prior application and in that it includes means for making the response to unbalance independent of drift of the oscillator supplying energy to the search coils.

Figure 1:
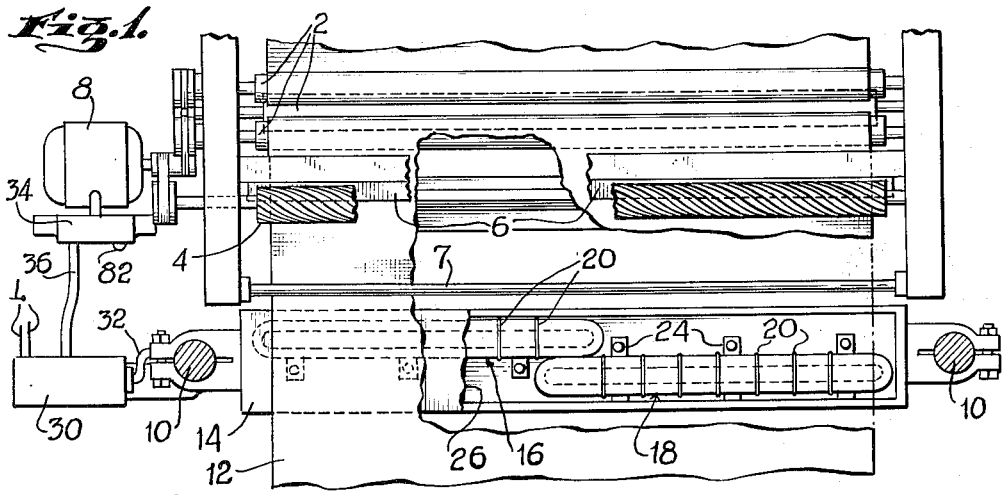
Figure 2:
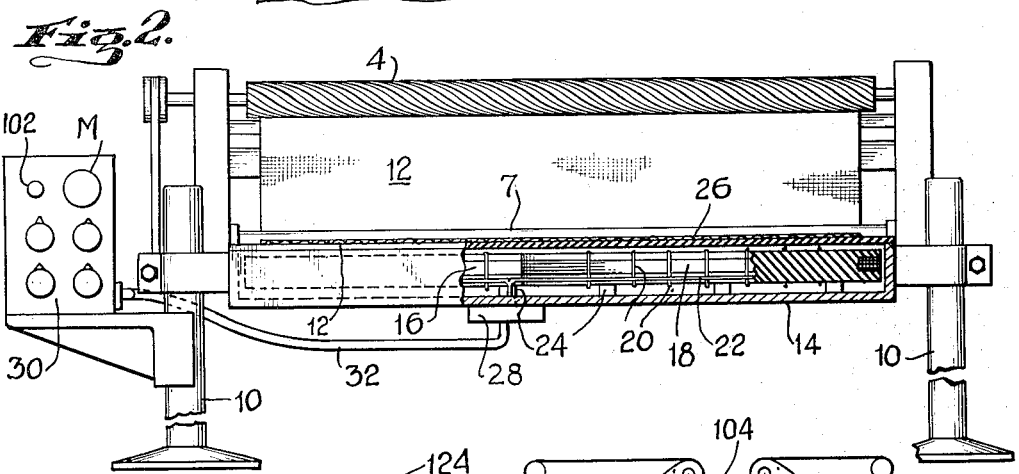
Figure 4:
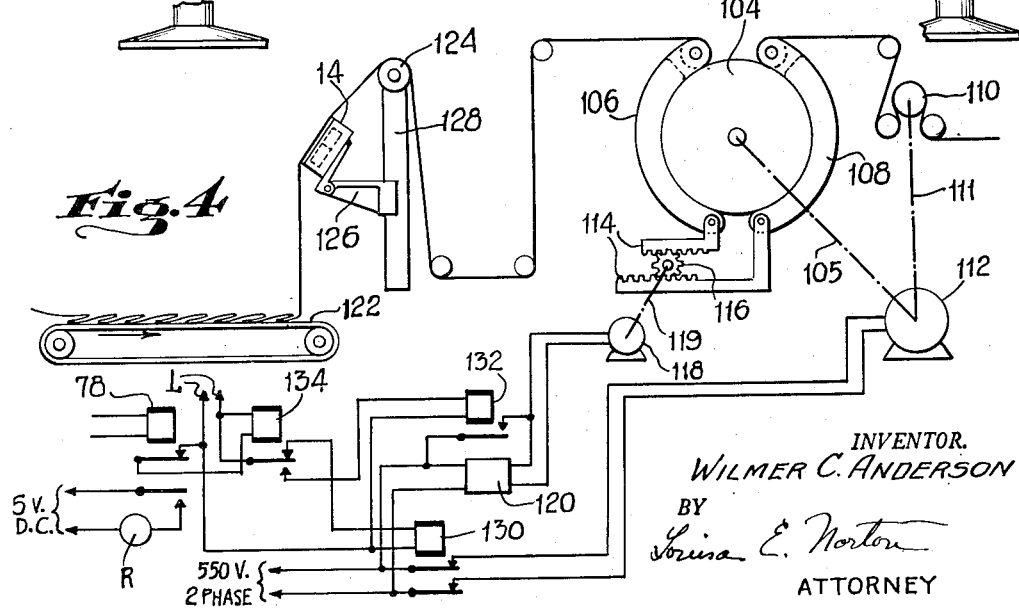
Figure 3:
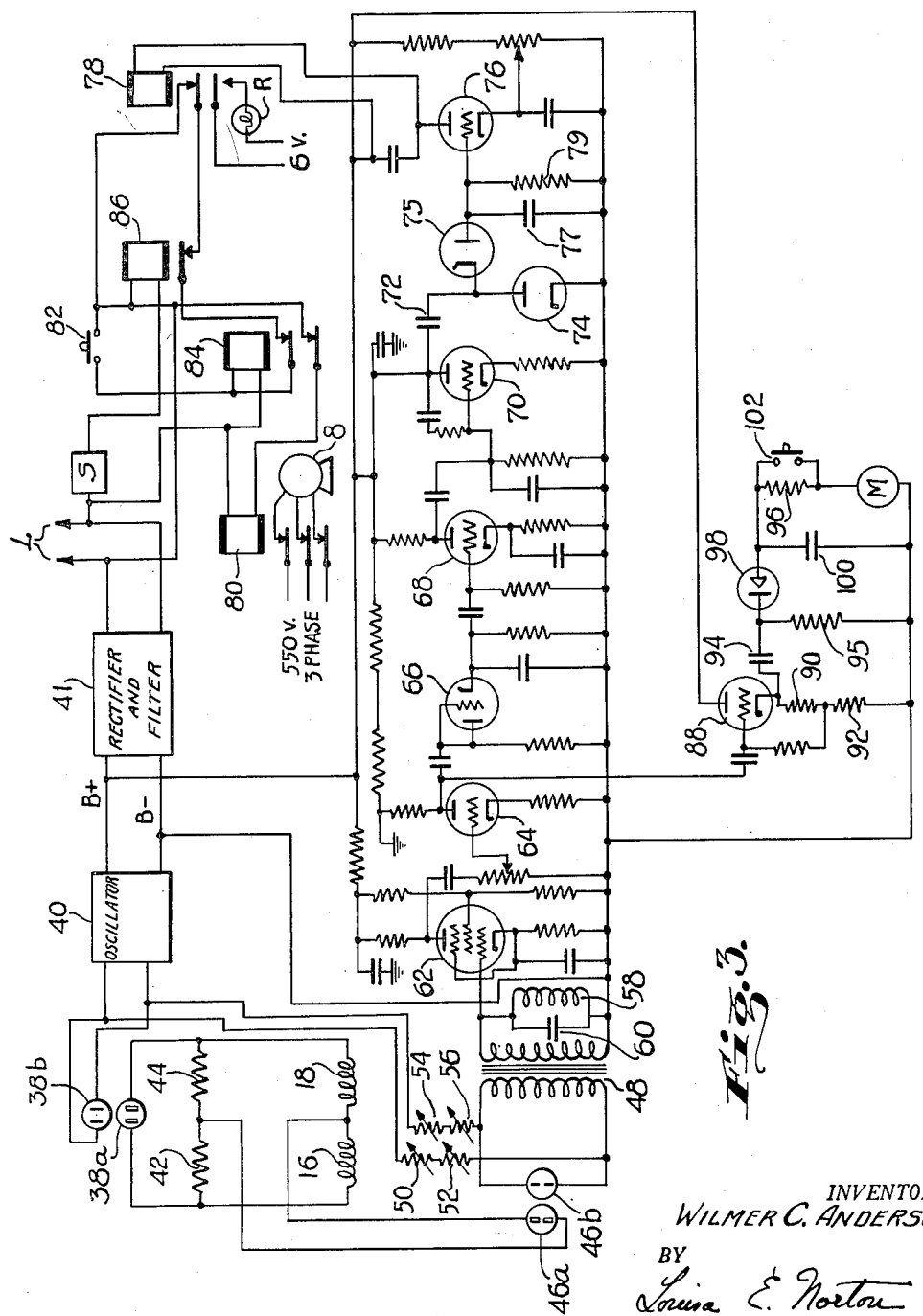

For a better understanding of the invention and of the novel features thereof, reference may be had to the accompanying drawings of which:

Figs. 1 and 2 are diagrammatic plan and front views, respectively, of a stop-motion device embodying the invention and arranged for control of a shearing machine, each view being partly broken away for clarity, Fig. 3 is a diagram of the circuits of the device of Figs. 1 and 2, and Fig. 4 is a diagram showing the stop motion device of the invention arranged for control of a pressing machine.

In Figs. 1 and 2, elements of a conventional shearing machine are diagrammatically illustrated. The fabric advancing rolls are indicated at 2, the rotatable spiral cylinder at 4, and the blade which cooperates with the spiral cylinder at 6. One guide bar is indicated at 7. The drive motor for the rolls 2 and for the cylinder 4 is indicated at 8. No attempt has been made to illustrate in the drawing a complete shearing machine as such machines are well known in the art and form no part of the present invention. Mounted on stanchions 10 at the input side of the machine for passage thereover of the fabric 12 to be sheared is a long shallow channel 14 of aluminum or the like which supports two like elongated coils 16 and 18. Each coil is composed of a plurality of turns of relatively fine insulated wire wound on a core of Bakelite or the like, each core being suitably grooved along its sides and ends for reception of the turns of the coil. In order that the device will not be affected by overall changes in moisture content of the fabric, an electrostatic shield is provided about each coil, each shield comprising a number of open loops 20 of tinned wire which surround the coil and core and are soldered to a wire 22 disposed along the side of the core beneath the groove carrying the coil and grounded, as by soldering to the channel 14, at one end. Each coil assembly, comprising the winding, core and shield, is supported above the base of the channel 14 by means of a plurality of spaced mounting blocks 24 of Bakelite or other non-conductor.

The major dimension of each coil is slightly greater than one half the length of the channel 14 and the coil assemblies are so disposed in the channel as together to extend beneath the full width of the fabric 12, the coils being displaced longitudinally of the fabric to permit slight overlapping beneath the center portion of the fabric. Thus each portion of the fabric 12 will pass over the core of one or the other of the coils during travel of the fabric and if a metal body, such as a burling needle, is in the fabric, the effective impedance of the coil over which the needle travels will be varied during the time that the needle is within the magnetic field of the coil. A thin plastic cover 26, of Bakelite or the like, is provided for the channel 14 to keep out dirt and lint and to provide a smooth surface for passage of the fabric thereover. A plug-in unit 28 for connecting a bridge circuit including the coils 16 and 18 into the detecting and control circuit hereinafter described in connection with Fig. 3, is mounted on the lower surface of the channel 14 substantially at the center thereof.

The power supply and various elements of the detecting and control circuit may be contained within a housing 30 suitably supported at one side of the path of travel of the fabric. The circuit elements within the housing 30 are connected by a cable 32 to the plug-in circuit of the coils and to circuits disposed in a casing 34 for the control of motor 8 by a cable 36. A source of energy for the system is indicated by the lines L which may be 110 volt 60 cycle power lines. Suitable switching and adjusting means may be conveniently mounted on the wall of casing 30 and these will be referred to hereinafter in connection with the description of the circuit of Fig. 3.

As shown in Fig. 3, the coils 16 and 18 are connected in series across the terminals of a socket 38a, which is adapted to be connected by means of a plug 38b to the output of an oscillator 40. A conventional rectifier and filter 41 connected to the power lines L provides energy for the oscillator 40 and for the amplifier and control tubes of the detecting circuit.

A pair of series connected resistors 42 and 44 are also connected across the terminals of socket 38a and the junction of these resistors is connected to one terminal of a second socket 46a, the other terminal of which is connected to the junction of search coils 16 and 18. A plug 46b, which is adapted for insertion in socket 46a, has its terminals connected across the primary of a transformer 48. A pair of adjustable resistors 50 and 52 are connected in series between one output lead of the oscillator 40 and one terminal of plug 46b and a second pair of adjustable resistors 54 and 56 are connected in series between the other output lead of the oscillator and the other terminal of plug 46b. With this arrangement, when plug 46b is inserted in the socket 46a and plug 38b in socket 38a, resistors 50 and 52 are connected in series across resistor 42 and resistors 54 and 56 are connected in series across coil 18.

A band pass filter comprising parallel connected inductor 58 and capacity 60, is connected across the secondary of transformer 48. When the effective impedance of either search coil is varied by passage thereover of a metal object, the bridge network comprising the coils 16 and 18 and resistors 42 and 44 is thrown out of balance. Energy of the frequency of the oscillator and modulated by the transient created by the bridge unbalance is then impressed across transformer 48, the signal frequency being determined by the rate of change of impedance of the search coil. The constants of the band-pass filter are so chosen that the filter will pass frequencies in the range $(F+f)$ to $(F-f)$ where F is the oscillator frequency and $f$ the low frequency components of the signal transient. Energy within the band of frequencies passed by the filter is impressed upon the input circuit of a pentode 62. The output from amplifier 62, after being further amplified by a triode 64, is demodulated in a rectifier 66. The recovered modulation, after amplification by a triode 68, is impressed across the input terminals of a triode 70, the anode of which is connected through a condenser 72 with the anode of a diode 74 and with the cathode of a second diode 75, the anode of which is connected to the control grid of a control tube 76, the diodes, together with the condenser 72, a condenser 77 and resistor 79 in the grid circuit of tube 76 serving as a voltage doubler as will be understood by those skilled in the art. The anode of control tube 76 is connected to B+ through the windings of a control relay 78. The control tube, in the absence of a signal, will pass current and hence relay 78 is normally energized. Relay 78 may directly control the circuit of motor 8, opening the motor circuit when deenergized as a result of unbalance of the bridge network, or it may, in conjunction with other and standard safety circuits of the machine, control the circuit of a second relay, which latter relay directly controls the motor circuit. Such arrangement is illustrated diagrammatically in Fig. 3 wherein the relay for controlling the circuit of motor 8 is indicated at 80, normally open safety switches controlled by other stop motion devices of the machine at S and a "start" push button switch at 82. Relay 80 is normally energized from the power lines L over a circuit including a front contact of a holding relay 84, the pick-up circuit of which includes the push-button switch 82. The holding circuit for relay 84 includes one of its own front contacts, a back contact of a normally deenergized safety relay 86, and a front contact of control relay 78. Thus when control relay 78 is deenergized as a result of a negative pulse appearing at the control grid of tube 76, the circuit of relay 84 is opened, which relay thereupon drops its armatures, opening its own holding circuit at one front contact and opening the circuit of the motor circuit controlling relay 80 at another front contact.

As the signal applied to the control grid of control tube 76, upon unbalance of the bridge network, contains no components of the frequency of the oscillator, the system is made insensitive to frequency drift of the oscillator resulting, for example, from temperature changes.

To assist in initial adjustment of the circuit, a cathode follower circuit including a meter M is connected to the output of amplifier 64. The meter circuit includes an amplifying tube 88, the anode of which is connected directly to B+ and the cathode of which is connected through a pair of series connected resistors 90 and 92 to B−. A condenser 94 and resistor 95 are connected in series across the cathode resistors 90 and 92 and the meter M is connected in series with a resistor 96 and rectifier 98 across resistor 95, a condenser 100 being provided across the meter M and resistor 96 to smooth out the A. C. ripple. A manually operable switch 102 is provided for shorting the resistor 96 during final adjustment for balance of the bridge.

The operation of the above described circuit will be clear from the description already given. With plugs 46b and 38b inserted in their respective sockets 46a and 38a resistors 50, 52, 54 and 56 are first adjusted with switch 102 open until the indicating needle of meter M is at zero or a low scale reading. The switch 102 is then closed and further and final adjustment is made, if desired. The sensitivity of the system will be greatest if this initial adjustment brings the bridge into balance but balance of the bridge network is not essential for operation. This is true because a steady or continued unbalance of the bridge results merely in energy of oscillator frequency being impressed upon rectifier 66. If this energy is not modulated by a signal the output from rectifier 66 will be a steady direct current and hence will not be transmitted by amplifier 68. The initial adjustment, whether or not made for zero meter reading, is preferably made while the machine controlled by the system is not in operation and the fabric is accordingly not in motion. This is not essential, however, as the system may be adjusted during travel of the fabric, so long, of course, as no metal bodies are in the fabric passing over the coils during the period of adjustment.

After the system has been balanced, push button 82 is momentarily depressed to energize relays 84 and 80 and thereby close the circuit of motor 8, assuming the machine is not already in operation. The fabric will then be drawn over the coils 16 and 18 by rotation of the rolls 2, spiral roll 4 will be rotated from motor 8 and the cloth will be sheared between this roll and the blade 6. When the effective impedance of either coil 16 or 18 changes as the result of passage thereover of a burling needle or the like in the fabric, a negative pulse is impressed on the control grid of control tube 76 deenergizing that tube and the relay 78 in the anode circuit thereof. Relay 78 thereupon releases its armatures, opening the circuit of holding relay 84 and closing the circuit of a signal light R. The holding relay 84 then releases its armatures breaking its holding circuit at a second point and opening the circuit of the motor circuit controlling relay 80, relays 84 and 80 and the motor 8 thus remaining deenergized until the system is again put into operation by closure of push button switch 82. With the above described circuit, the control device does not interfere with the operation of any other stop-motion or safety device that may be employed with the machine as should one of the switches S be closed due to faulty operation of some part of the machine, relay 86 will be energized to pick up its armature and open the circuit of holding relay 84. As lamp R will not be lighted under these conditions, it will at once be apparent that the resultant stoppage of motor M was not due to metal or an electrolyte in the fabric about to be processed on the machine.

All of the circuit elements diagrammatically indicated in Fig. 3, with the exception of the search coils 16 and 18, resistors 42 and 44 and the relays 80, 84 and 86 with their associated circuits, can be housed within a single casing, such as that indicated at 30 in Fig. 1. The dial of meter M and the adjusting knobs for resistors 50, 52, 54 and 56 can be conveniently mounted on the wall of the casing as can the push button 102. The coils 16 and 18 are mounted, as hereinbefore described, in the channel 14 and the resistors 42 and 44 can be mounted within the terminal box 28 which also carries the sockets 36a and 46a. The relays 80, 84 and 86 and associated circuits can be located within the casing 34 and the start button 82 can be mounted on one wall thereof.

In Fig. 4, to which reference may now be had, the driven drum or roll of a conventional press is indicated at 104, the steam jacketed beds that cooperate therewith at 106 and 108, the feed rolls for the fabric at 110 and the motor for driving the drum and feed rolls at 112. The driving connections for the drum 104 and rolls 110 are indicated symbolically by dashed lines 105 and 111 respectively. The beds 106 and 108 are ordinarily provided with means for retracting them from the drum 104, as for example the racks 114 and gear 116 adapted to be rotated by the reversible motor 118, as indicated by the dashed line 119. The direction of rotation of the motor 118 is determined by suitable limit switches to prevent overtravel of the gear and proper direction of rotation of the motor when the press is put in operation. As such switches and the circuit connections therefor form no part of the present invention they have not been shown in the drawing but may be assumed to be within a control box 120 in the circuit of motor 118. The channel 14 carrying the search coils of the invention may be positioned between the conveyer 122 carrying the fabric in folded or piled form and the front guide bar 124 of the press and may be mounted, preferably adjustably, on brackets 126 secured to the supports 128 of the bar 124. In order that the feed of fabric to the press be stopped and that the beds 106 and 108 be retracted from the drum 104 when foreign bodies are present in the fabric, the circuit of drive motor 112 is controlled over front contacts of a relay 130 and a by-pass circuit about the control box 120 is provided and controlled over a front contact of a relay 132. Relay 130 is normally energized when the press is in operation and relay 132 is normally deenergized, the circuit of these relays being controlled over front and back contacts respectively of a relay 134. Relay 134 is a repeater for relay 78 in the anode circuit of control tube 76 (see Fig. 3) and hence is energized except when a signal is impressed upon that tube indicative of a change in the condition of the bridge circuit. Thus, when a metal particle in the fabric passes over the search coils in channel 14, relays 78 and 134 are deenergized, resulting in opening of the circuit of relay 130 and closing of the circuit of relay 132, the former operating to open the circuit of motor 112 and the latter to close that of motor 118. The press is thereupon stopped and the beds 106 and 108 retracted to prevent scorching of fabric on the roll 104.

The new detecting and control device has now been described with reference to its application to the control of a shearing machine and of a pressing machine. The device may be constructed to be extremely sensitive and quick acting. For example, one device constructed as heretofore described and using a 4 kc. oscillator and search coils of 33 inches long, each of 200 turns of #26 wire having a resistance of 40 ohms and an inductance of 23 millihenrys, unfailingly detected a broken burling needle, a metal clip from paper match boxes, and other small metal objects when the object was passed over a coil at the rate of 45 yards per minute.

Although the new device is not affected, as heretofore indicated by overall changes in moisture content of the fabric passing over the coils, any localized very wet areas of the fabric will be detected and this feature is important as unevenly wet fabrics do not handle properly on finishing machines. This is true of shearing and pressing machines as fabric with wet spots therein cannot be properly sheared or pressed on automatic machines.

In the particular embodiment of the invention illustrated in the drawings, the control circuit operates to give a signal and to stop the motor operating the finishing machine. Obviously other working parts of the machine could be controlled instead of, or in addition to, the drive motor. For example, in a shearing machine, the spiral roller could be lifted or the blades retracted, if desired, or, if desired, signals only could be given, leaving it to the operator to stop the machine.

Although the detector and stop-motion device of the invention has been described herein with particular reference to its application to the control of fabric finishing machines, obviously the device may be advantageously employed for detection of conductors in any non-conducting material whether textile or not and whether in sheet or other form.

The following is claimed:

1. The combination with a textile fabric press having means for advancing fabric, a rotatable drum and steam jackets cooperating therewith and means for retracting the jacket from the drum, of a metal detector and stop motion device comprising a source of electrical oscillations, a circuit energized from said source and including a pair of search coils positioned for passage of the fabric thereby in its travel to the drum, a detecting circuit coupled to said first mentioned circuit and responsive to a change in the effective impedance of a coil occasioned by passage of a metal body through the field thereof, and means controlled by said detecting circuit for stopping the fabric advancing means and for actuating the jacket retracting means upon occurrence of a metal body in the fabric to be pressed.

2. The combination according to claim 1 wherein the fabric advancing means includes fabric engaging rolls and a motor for driving the same, said motor serving also to rotate the drum and wherein said last mentioned means of the claim includes a relay controlling the circuit of said motor.

3. A device for detecting conductors in traveling material comprising in combination a source of electrical oscillations, a circuit energized from said source and including a pair of coils at least one of which is positioned adjacent the path of the travel of the material, at least one of said coils being so oriented with respect to the material that a conductor in the material will pass through the field of said one coil and thereby vary the effective impedance thereof and create a transient signal, a circuit coupled to said first circuit and including means for detecting said transient signals, means including at least one tube connected to said detecting means for amplifying the detected signal, a normally energized control tube having a control grid, a voltage doubler coupling the amplifying and control tubes for impression of a negative pulse on the control grid of said control tube to cause de-energization thereof upon passage of a conductor through the field of at least said one search coil, and means responsive to the de-energization of said control tube for arresting the travel of the material.

4. A device for detecting conductors in traveling material comprising in combination a source of electrical oscillations, a bridge circuit energized from said source and including a pair of coils at least one of which is positioned adjacent the path of travel of the material, at least one of said coils being so oriented with respect to the material that a conductor in the material will pass through the field thereof and thereby vary the effective impedance of said one coil and create a transient signal, means for detecting said transient signal, an amplifier having at least one tube for amplifying said detected transient signal, an output tube having a control grid, a voltage doubler coupling said amplifier to the grid of said output tube for impressing a control pulse on said output tube in accordance with said transient signal, and means connected to the output of said output tube responsive to said control pulse for signaling the presence of a conductor in the traveling material.

5. The combination with a textile machine having means for advancing fabric therethrough, of a metal detector and stop motion device comprising a source of electrical oscillations, a circuit energized from said source and including a pair of coils at least one of which is positioned for passage of the fabric thereby in its travel through said machine, a detecting circuit coupled to said first mentioned circuit and responsive to a change in the effective impedance of said one coil occasioned by passage of a metal body through the field thereof, an amplifier tube connected to said detecting circuit, a control tube having a control grid, a voltage doubler coupling said amplifying and control tubes, and means controlled by said control tube for stopping the fabric advancing means and for actuating a signal device to indicate the presence of a metal body in the fabric.

6. A device for detecting conductors in traveling material, a source of electrical oscillations, a circuit energized by said electrical oscillations, means including said circuit for modulating said electrical oscillations with other electrical oscillations of different frequency produced in accordance with the presence of a conductor in said traveling material, a detector coupled to said circuit for rectifying said modulated electrical oscillations, an amplifier circuit connected to the output of said detector, a control tube having a control grid, a voltage multiplier coupling said amplifier circuit with the grid of said control tube, and means controlled by said control tube for indicating the presence of a conductor in the traveling material.

7. A device for detecting conductors in traveling material in accordance with claim 6 wherein the last-mentioned means includes a relay circuit for controlling the stoppage of material upon the detection of a conductor therein.

WILMER C. ANDERSON.

References Cited in the file of this patent

UNITED STATES PATENTS

| Number | Name | Date |
|--------|------|------|
| 2,032,176 | Kovalsky | Feb. 25, 1936 |
| 2,223,463 | Rosenthal | Dec. 3, 1940 |
| 2,237,254 | Broekhuysen | Apr. 1, 1941 |
| 2,261,631 | Rosenthal | Nov. 4, 1941 |
| 2,374,821 | La Fond | May 1, 1945 |
| 2,390,799 | Linsen Meyer et al. | Dec. 11, 1945 |
| 2,457,695 | Liskow | Dec. 28, 1948 |
| 2,473,916 | Snyder | June 21, 1949 |
| 2,486,525 | Fuhrer et al. | Nov. 1, 1949 |
| 2,504,731 | Rose et al. | Apr. 18, 1950 |
| 2,513,745 | Reynolds | July 4, 1950 |

OTHER REFERENCES

Journal of Scientific Instruments, vol. 20, Sept. 1943, page 147. (Copy in Div. 48, 175-183-23.2.)